United States Defensive Publication [19] (H) [11] T983,006

Bailey et al. [43] Jun. 5, 1979

[54] INJECTION NOZZLE ASSEMBLY

[75] Inventors: John M. Bailey, Dunlap; Stanley J. Kranc, Morton, both of Ill.

[73] Assignee: Caterpillar Tractor Co., Peoria, Ill.

[21] Appl. No.: 941,698

[22] Filed: Sep. 12, 1978

Related U.S. Application Data

[63] Continuation of Ser. No. 828,692, Aug. 29, 1977, abandoned.

[51] Int. Cl.[2] ..... B05B 1/30

[52] U.S. Cl. ..... 239/533.9

[57] ABSTRACT

An injection nozzle assembly has a housing 12, a valve 14, and a sleeve 16. The housing has an axis 18 and a chamber 24. The housing has a shoulder 26 which defines first and second chamber portions 28 and 30, respectively. The valve has a head 32 position in the first chamber portion and a stem 34 extending from the head into the second chamber portion. Biasing means 36 biases the valve head towards the shoulder. The sleeve is positioned in the first chamber portion and moveable along the axis between a first position at which the sleeve loads the biasing apparatus and a second position at which the sleeve is free of loading contact with the biasing apparatus. In a first embodiment, a braised joint 48 maintains the sleeve at a preselected position between the first and second positions. In a second embodiment, a cap with an opening for the sleeve and a tapered inside surface cooperates with a tapered mating surface on the housing which urges the housing against the sleeve to maintain the sleeve in the desired position. In a third embodiment, a cap with an opening for the sleeve urges a wedge shaped member between the housing and sleeve to maintain the sleeve.

7 Claims, 1 Sheet Drawing,

10 Pages Specification

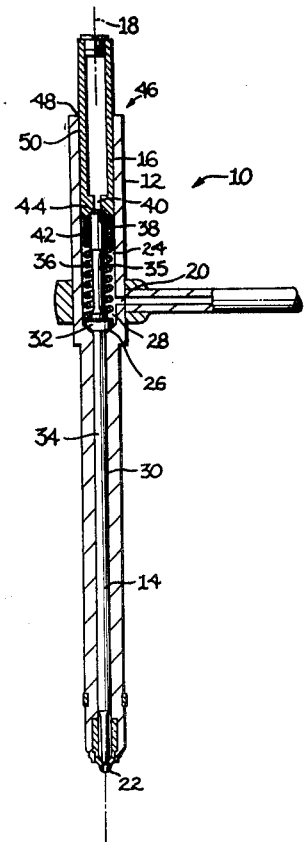

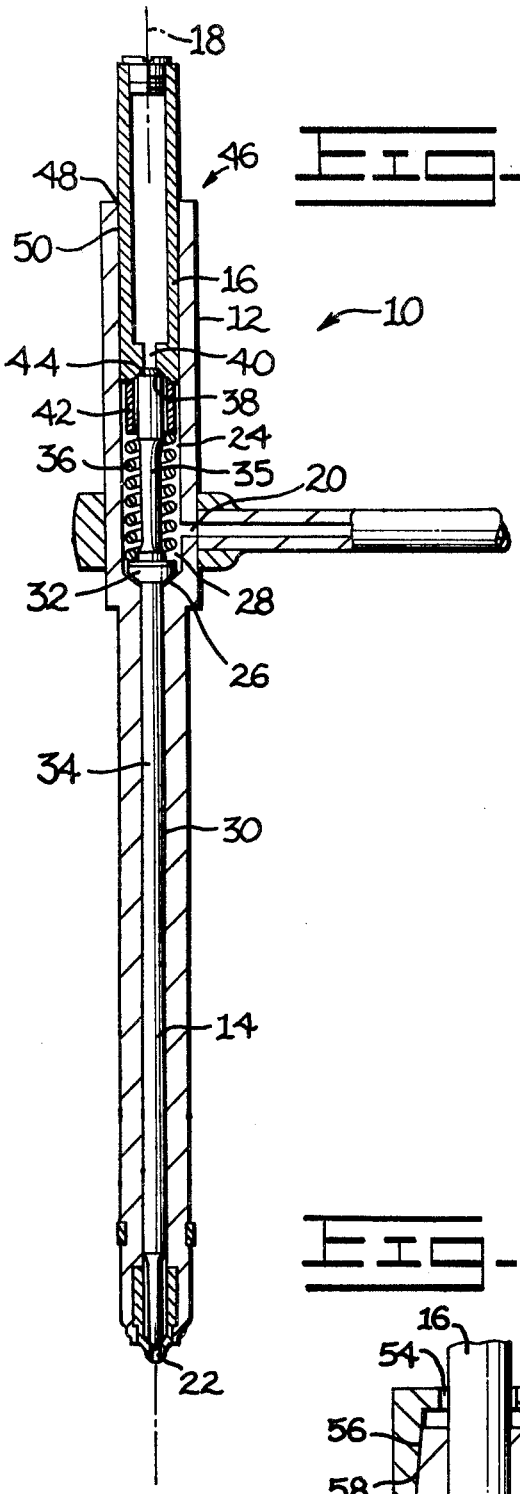
FIG. 1
FIG. 2
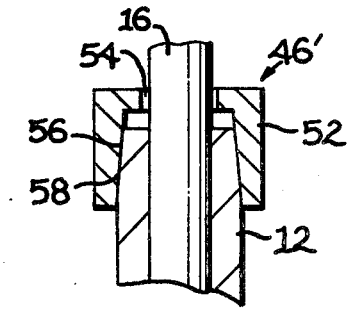
FIG. 3
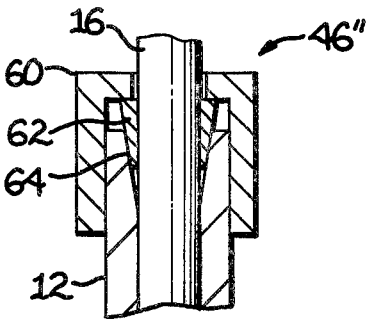

The file of this unexamined application may be inspected and copies thereof may be purchased (849 O.G. 1221, Apr. 9, 1968).